(12) United States Patent
Guan

(10) Patent No.: US 10,717,027 B2
(45) Date of Patent: Jul. 21, 2020

(54) MODIFIED APPARATUS FOR WASTEWATER RECYCLING

(71) Applicant: Zhen-Fa Guan, Taoyuan (TW)

(72) Inventor: Zhen-Fa Guan, Taoyuan (TW)

( * ) Notice: Subject to any disclaimer, the term of this patent is extended or adjusted under 35 U.S.C. 154(b) by 35 days.

(21) Appl. No.: 16/112,346

(22) Filed: Aug. 24, 2018

(65) Prior Publication Data
US 2020/0061499 A1 Feb. 27, 2020

(51) Int. Cl.
| | | |
|---|---|---|
| *B01D 29/66* | (2006.01) | |
| *B01D 29/01* | (2006.01) | |
| *B01D 29/56* | (2006.01) | |
| *B01D 37/04* | (2006.01) | |
| *C02F 1/00* | (2006.01) | |
| *E03D 1/00* | (2006.01) | |
| *C02F 103/00* | (2006.01) | |

(52) U.S. Cl.
CPC ............ *B01D 29/66* (2013.01); *B01D 29/01* (2013.01); *B01D 29/56* (2013.01); *B01D 37/045* (2013.01); *C02F 1/001* (2013.01); *C02F 1/008* (2013.01); *E03D 1/00* (2013.01); *C02F 2103/002* (2013.01); *C02F 2209/42* (2013.01); *C02F 2303/16* (2013.01)

(58) Field of Classification Search
CPC ........ B01D 29/01; B01D 29/03; B01D 29/56; B01D 29/605; B01D 29/66; B01D 37/045; C02F 1/001; C02F 1/008; C02F 2103/002; C02F 2103/005; C02F 2209/42; C02F 2303/16; E03B 1/041; E03B 1/042; E03B 2001/045; E03D 1/00
See application file for complete search history.

(56) References Cited

U.S. PATENT DOCUMENTS

| | | | |
|---|---|---|---|
| 2013/0126433 A1* | 5/2013 | Wolff | B01D 61/147 210/650 |
| 2017/0121200 A1* | 5/2017 | Brozell | C02F 9/00 |
| 2019/0048563 A1* | 2/2019 | Thompson | B01D 29/668 |

* cited by examiner

*Primary Examiner* — Terry K Cecil
(74) *Attorney, Agent, or Firm* — Che-Yang Chen; Law Office of Michael Chen

(57) ABSTRACT

The present invention is a modified apparatus for wastewater recycling including a toilet tank device, a water amount control assembly, and a three-way pipe. The toilet tank device includes a filtering space provided with a filtering apparatus and a water level sensing apparatus and a device area provided with a pressurizing device, at least one filter, and a transfer pipe. The water amount control assembly includes a driving apparatus, a cleaning pipe group, and a wastewater transfer pipe group. When clean water is transferred to clean the filter, the clean water can be transferred through a combination of the cleaning pipe group and the pressurizing device with a water amount controlled by the driving apparatus, and wastewater passing through the filtering apparatus can be transferred through a combination of the wastewater transfer pipe group and the pressurizing device with a water output amount controlled by the driving apparatus.

11 Claims, 11 Drawing Sheets

MODIFIED APPARATUS FOR WASTEWATER RECYCLING

BACKGROUND OF THE INVENTION

1. Technical Field

The present invention is a wastewater device, and in particular, a modified apparatus for wastewater recycling.

2. Background Art

As affected by the rapid changes in global climate, the original fixed rainfall pattern changes, resulting in heavy rains in previously rainless areas while long-term droughts in usual rainy areas. Most of water resources available to humans come from rainwater. When the rainfall is not stable, the distribution and application of water resources become more important. Otherwise, water shortage will become a normal problem of people's livelihood.

Therefore, related devices for water saving are more popular. The well-known water-saving device in people's livelihood is the sanitary device. A water-saving device for a toilet tank is mainly to replace original toilet tank accessories with two-stage flushing accessories, to save at least half of the flushing water. However, this method reduces only the amount of used clean water, and cannot really use wastewater for a cleaning purpose. In addition, most of common water-saving devices in daily life still lack automation functions, which are outdated in the era of advanced technology. This is the problem to be completely solved by the present invention.

SUMMARY OF THE INVENTION

The main objective of the present invention is to use a driving apparatus to select a water amount of wastewater or clean water to be transferred, and cooperate with a wastewater transfer pipe group and a cleaning pipe group to achieve automatic wastewater recycling for reuse, and have an advantage that wastewater recycling and reuse can be fully automated without human monitoring.

To achieve the foregoing objective, the present invention is a modified apparatus for wastewater recycling, including: a toilet tank device, including a filtering space and a device area, where the filtering space is provided with a filtering apparatus and a water level sensing apparatus, and the device area is provided with a pressurizing device, at least one filter, and a transfer pipe connected to the filtering space to transfer filtered water; a water amount control assembly, including a driving apparatus, a cleaning pipe group in which a flow direction of clean water is controlled by the driving apparatus, and a wastewater transfer pipe group in which a flow direction of wastewater is controlled by the driving apparatus; and a three-way pipe, including a first inlet pipe, a second inlet pipe, and a first drain pipe connected to the first inlet pipe and the second inlet pipe, where the first drain pipe is connected to the pressurizing device, the first inlet pipe is connected to the wastewater transfer pipe group so that wastewater is transferred to the pressurizing device through the first drain pipe and then filtered by the filter and discharged, and the second inlet pipe is connected to the cleaning pipe group so that clean water is transferred to the pressurizing device through the first drain pipe, and the clean water is transferred to the filter for cleaning and discharged.

In some embodiments, the cleaning pipe group includes a first clean water pipe group and a second clean water pipe group, the first clean water pipe group is provided with a first input pipe connected to an external clean water inlet and a first output pipe connected to the second inlet pipe, and the second clean water pipe group is provided with a second input pipe connected to the pressurizing device and a second output pipe connected to the filter.

In some embodiments, the wastewater transfer pipe group includes a first wastewater pipe group and a second wastewater pipe group, the first wastewater pipe group is provided with a first wastewater input pipe connected to the filtering space to transfer recycled wastewater and a first wastewater output pipe connected to the first inlet pipe, and the second wastewater pipe group is provided with a second wastewater input pipe connected to the pressurizing device and a second wastewater output pipe connected to the filter.

In some embodiments, the modified apparatus for wastewater recycling further includes a transfer pipe connected to the second wastewater output pipe and a control valve for controlling a water discharge amount of the transfer pipe.

In some embodiments, the filter is provided with a water flow switch controlled by the driving apparatus.

In some embodiments, the modified apparatus for wastewater recycling further includes a purified water transfer pipe connected to the water flow switch.

In some embodiments, the filtering apparatus includes a plurality of filtering screens.

In some embodiments, the modified apparatus for wastewater recycling further includes a filtered water transfer pipe mounted between a plurality of filters to transfer wastewater or clean water.

In some embodiments, the modified apparatus for wastewater recycling further includes an external sanitary fixture that is coupled to the filtering space to input wastewater.

In some embodiments, the modified apparatus for wastewater recycling further includes a reserve tank that is connected to the purified water transfer pipe to store clean water and is internally provided with a tank water level sensor, a drain port, and a pumping motor.

In some embodiments, the modified apparatus for wastewater recycling further includes a control box in signal connection with the tank water level sensor to determine the water level status in the reserve tank.

In some embodiments, the modified apparatus for wastewater recycling further includes a toilet device, where the toilet device is provided with a toilet tank device, and the toilet tank device is provided with a toilet tank water level sensor in signal connection with the control box to determine a water amount of clean water in the toilet tank, and a control valve for tap water supplement of the toilet tank.

In some embodiments, the modified apparatus for wastewater recycling further includes a tap water source switching apparatus connected to the control valve for tap water supplement of the toilet tank.

DETAILED DESCRIPTION OF THE PREFERRED EMBODIMENTS

Figure 1:
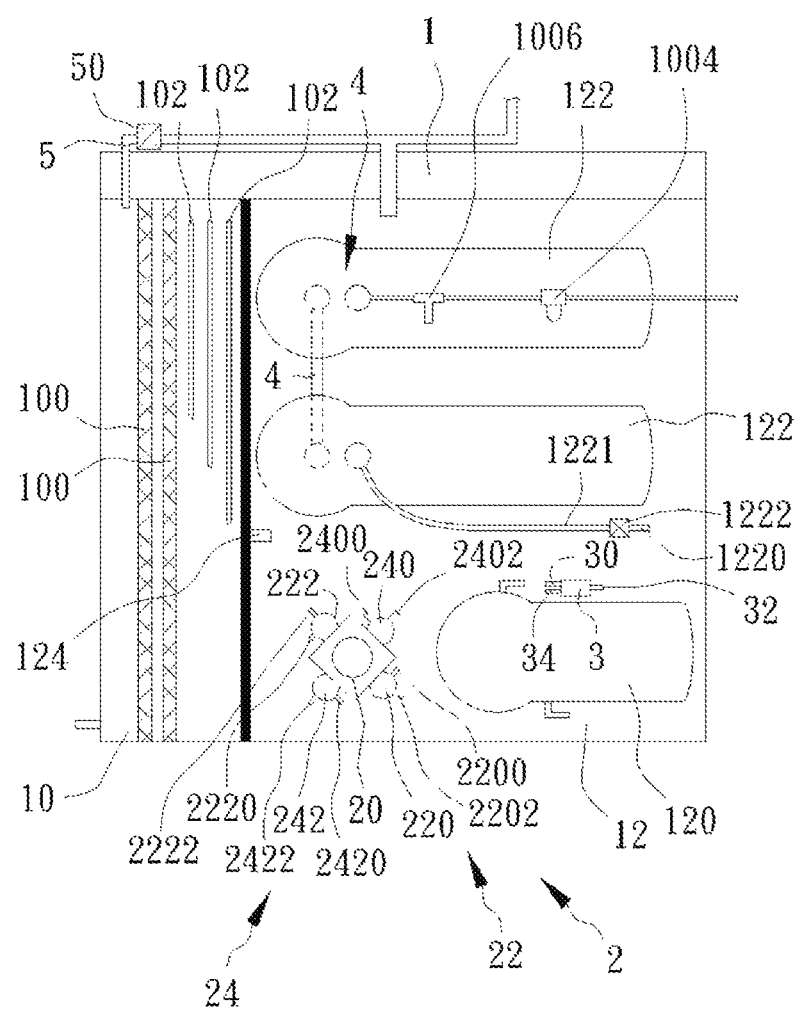
FIG. 1 is a schematic view of a preferred embodiment of the present invention.
Figure 2:
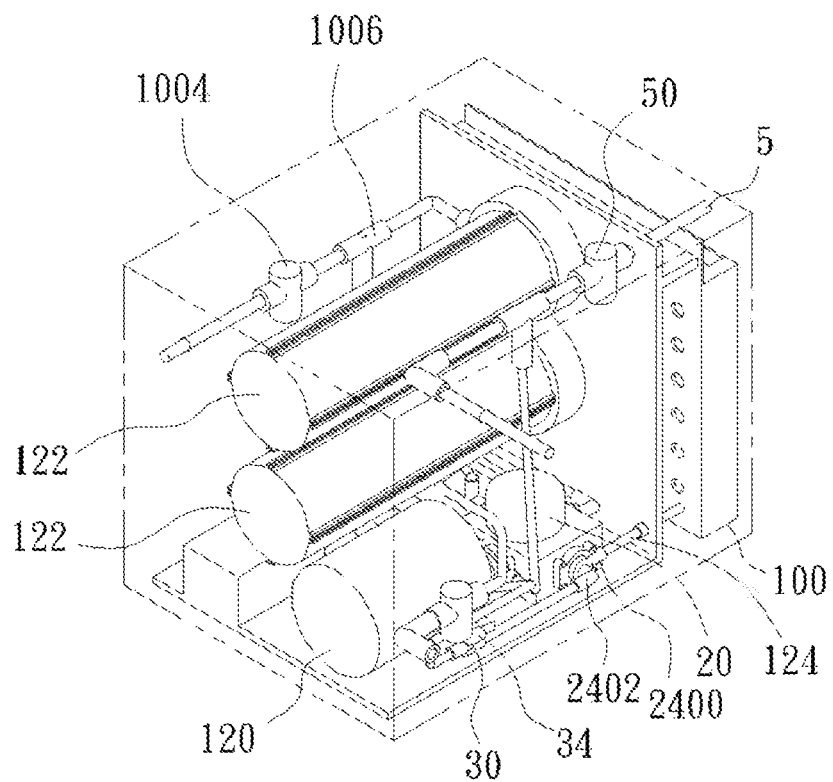
FIG. 2 is a schematic perspective view of a preferred embodiment of the present invention.

Referring to FIG. 1 and FIG. 2 for a schematic view and a schematic perspective views of a preferred embodiment of the present invention, the present invention is a modified apparatus for wastewater recycling, which mainly includes a toilet tank device 1, a water amount control assembly 2, and a three-way pipe 3. The toilet tank device 1 includes a filtering space 10 and a device area 12. The filtering space 10 is provided with a filtering apparatus 100 (including a plurality of filtering screens) and a water level sensing apparatus 102 (which is a sensing electrode rod). The filtering space 10 and the device area 12 are isolated from each other. The water level sensing apparatus 102 detects a water level of wastewater in the filtering space 10, that is to be filtered by the filtering apparatus 100. The device area 12 is provided with a pressurizing device 120, at least one filter 122, and a transfer pipe 124 connected to the filtering space 10. The pressurizing device 120 is provided with a required transformer, and the pressurizing device 120 can pressurize wastewater or clean water to achieve a better cleaning effect.

In addition, the water amount control assembly 2 includes a driving apparatus 20 (which is a driving motor), a cleaning pipe group 22, and a wastewater pipe group 24. A flow direction of clean water in the cleaning pipe group 22 is controlled by the driving apparatus 20, and a flow direction of wastewater in the wastewater pipe group 24 is controlled by the driving apparatus 20. The cleaning pipe group 22 includes a first clean water pipe group 220 and a second clean water pipe group 222. The first clean water pipe group 220 is provided with a first input pipe 2200 and a first output pipe 2202. The second clean water pipe group 222 is provided with a second input pipe 2220 and a second output pipe 2222.

Further, the three-way pipe 3 includes a first inlet pipe 30, a second inlet pipe 32, and a first drain pipe 34. The first drain pipe 34 is connected to the first inlet pipe 30 and the second inlet pipe 32. The first drain pipe 34 is connected to the pressurizing device 120. The first inlet pipe 30 is connected to the wastewater pipe group 24 so that wastewater is transferred to the pressurizing device 120 through the first drain pipe 34 and then filtered by the filter 122 and discharged for storage. The second inlet pipe 32 is connected to the cleaning pipe group 22 so that clean water is transferred to the pressurizing device 120 through the first drain pipe 34, and is transferred to the filter 122 for cleaning and then discharged.

In the foregoing, in the cleaning pipe group 22, the first input pipe 2200 disposed in the first clean water pipe group 220 is mainly connected to an external clean water inlet to introduce clean water, and then controlled by the driving apparatus 20 whether to transfer water; the first output pipe 2202 is connected to the second inlet pipe 32. The second clean water pipe group 222 is provided with the second input pipe 2220 and the second output pipe 2222. The second input pipe 2220 is connected to the pressurizing device 120, and the second output pipe 2222 is connected to the filter 122. The filter 122 is provided with a water outlet 1220 for discharging washing sewage, and the water outlet 1220 is connected to a transfer pipe 1221 and a control valve 1222 for controlling a water discharge amount.

In the foregoing, the wastewater pipe group 24 includes a first wastewater pipe group 240 and a second wastewater pipe group 242. The first wastewater pipe group 240 is provided with a first wastewater input pipe 2400 and a first wastewater output pipe 2402. The wastewater input pipe 2400 is mainly connected to the filtering space 10 to transfer recycled wastewater. The first wastewater output pipe 2402 is connected to the first inlet pipe 30. The second wastewater pipe group 242 is provided with the second wastewater input pipe 2420 and the second wastewater output pipe 2422. The second wastewater input pipe 2420 is connected to the pressurizing device 120, and the second wastewater outlet pipe 2422 is connected to the filter 122. In addition, the filter 122 is provided with a water flow switch 1004 controlled by the driving apparatus 20, and is further provided with a purified water transfer pipe 1006 connected to the water flow switch 1004. Further, a filtered water transfer pipe 4 is mounted between a plurality of filters 122 to transfer wastewater or clean water.

Figure 3:
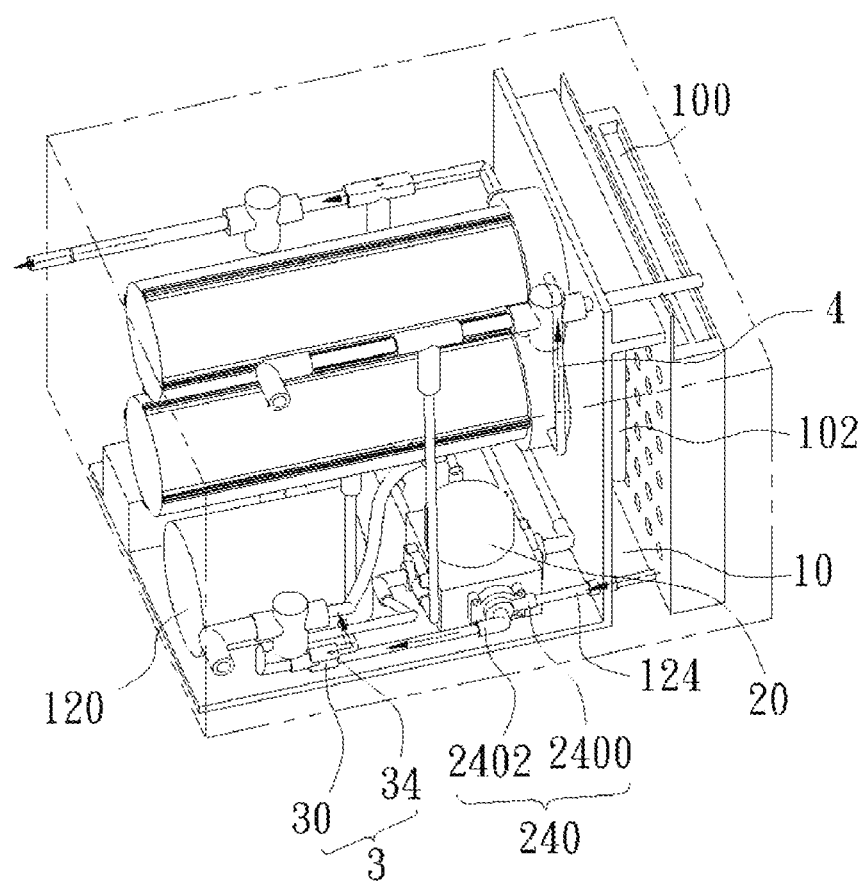
FIG. 3 is a schematic perspective view of transferring wastewater for storage according to the present invention.
Figure 4:
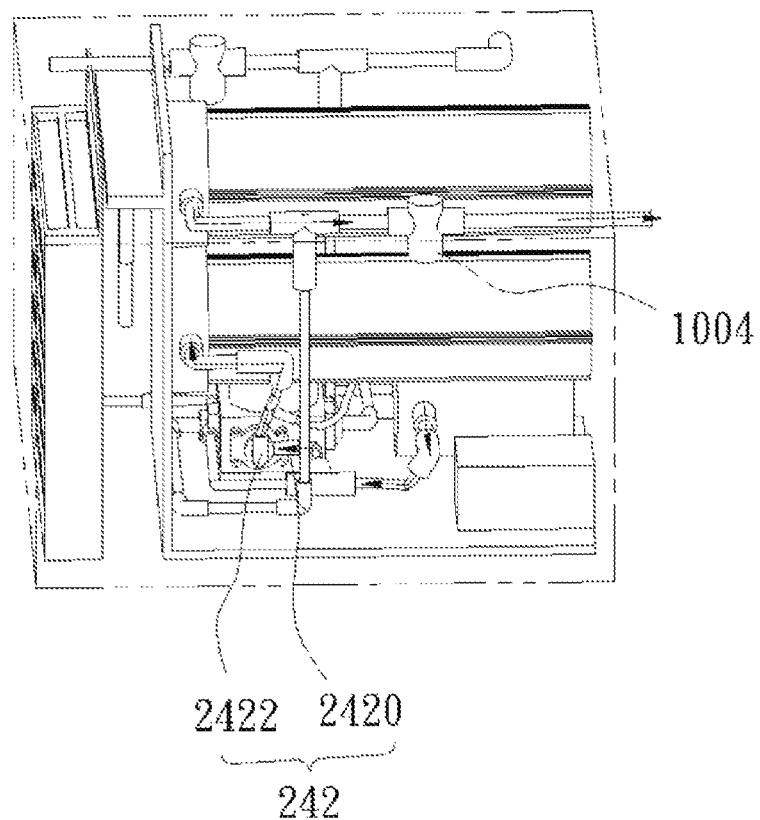
FIG. 4 is another schematic perspective view of transferring wastewater for storage according to the present invention.
Figure 5:
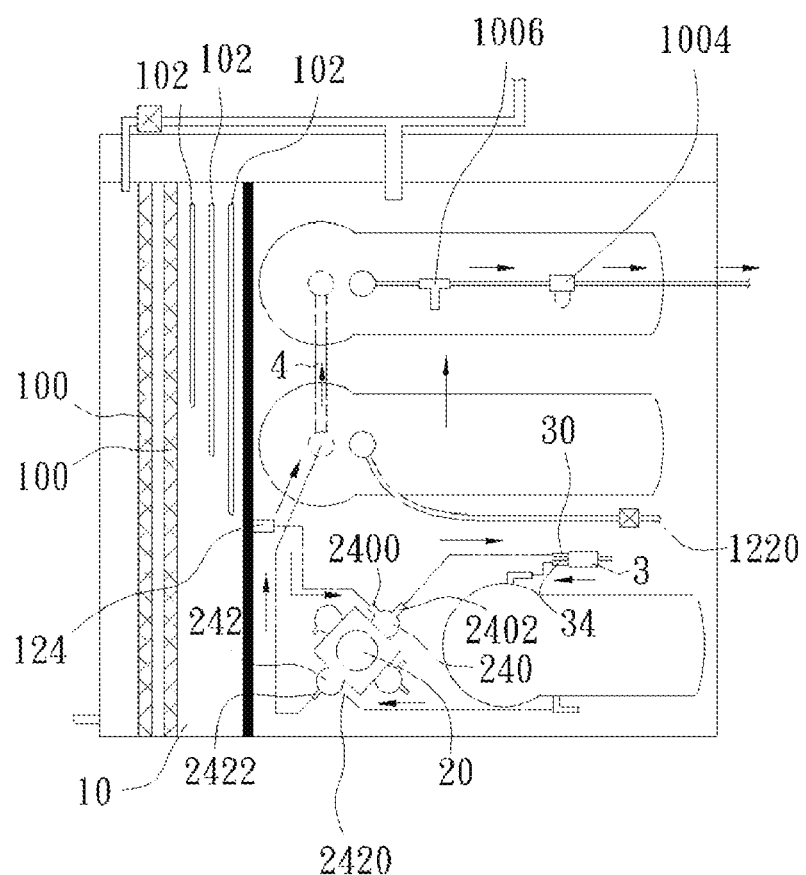
FIG. 5 is a schematic operation view of transferring wastewater for storage according to the present invention.

Referring to FIG. 3, FIG. 4, and FIG. 5 together for a schematic perspective view of transferring wastewater for storage according to the present invention, another schematic perspective view of transferring wastewater for storage, and a schematic operation view of transferring wastewater for storage, in FIG. 3, for example, wastewater is transferred and passes through two filters. Arrows in the figure indicate a direction of recycled wastewater. When external recyclable wastewater is to be stored, the wastewater first needs to be cleaned by the final filter. Therefore, the wastewater must first pass through the filtering apparatus 100 of the filtering space 10 in the toilet tank device 1. The filtering apparatus 100 is mainly composed of a plurality of filtering screens arranged side by side. Therefore, impurities in the wastewater can be filtered and removed through the filtering apparatus 100. The water level sensing apparatus 102 needs to sense an amount of input wastewater to avoid excess input. When the water level sensing apparatus 102 senses that the water amount is too high or too low, an external control device can control or stop water supplement. The filtered wastewater can be input to the first wastewater input pipe 2400 in the first wastewater pipe group 240 through the transfer pipe 124. The driving apparatus 20 is mainly used to control an input amount of recycled wastewater. The recycled wastewater is input from the first wastewater output pipe 2402 to the pressurizing device 120 through the first inlet pipe 30 and the first drain pipe 34 in the three-way pipe 3, and then the recycled wastewater is discharged from the pressurizing device 120 to the second wastewater input pipe 2420 in the second wastewater pipe group 242, and transferred to one of the filters 122 (located at a lower position) through the second wastewater outlet pipe 2422. Because a filtered water transfer pipe 4 for transferring wastewater or clean water is additionally disposed between two filters 122, after being filtered by a first filter 122, the recycled wastewater is transferred to a second filter 122 through the filtered water transfer pipe 4 for secondary filtering, and finally discharged and stored through the purified water transfer pipe 1006, so that the recycled wastewater can be reused. In this way, wastewater recycling and reuse can be fully automated without human monitoring.

Figure 6:
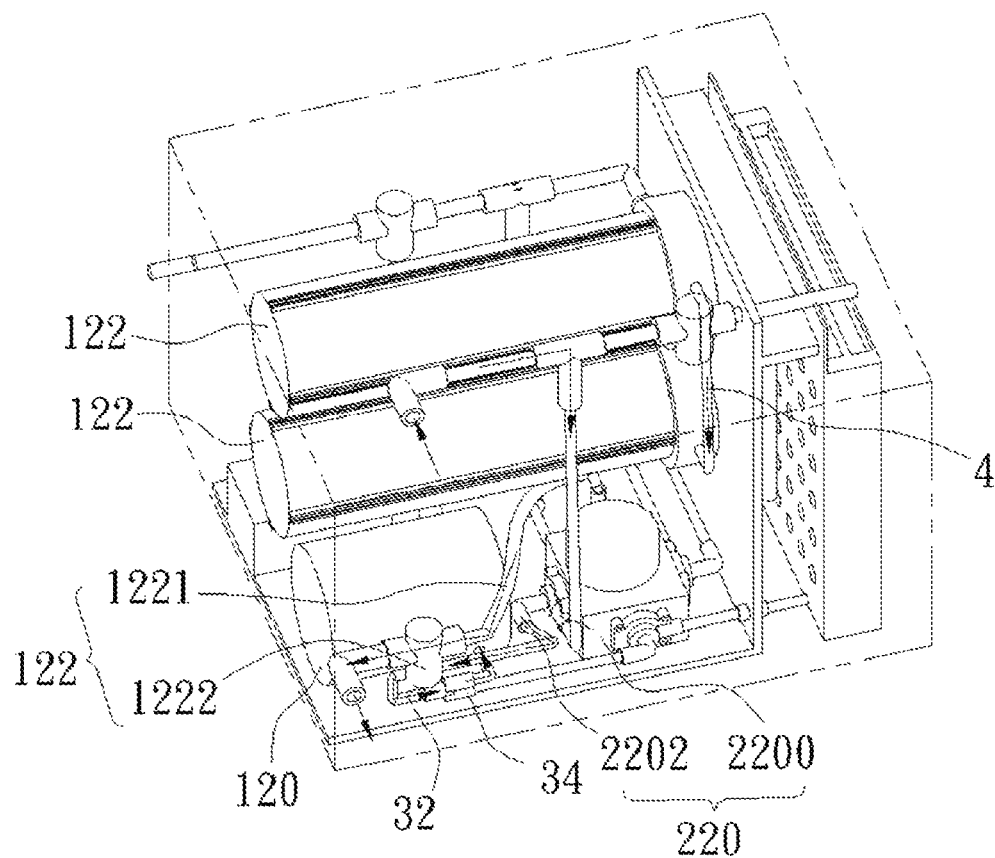
FIG. 6 is a schematic perspective view of transferring clean water to clean a filter according to the present invention.
Figure 7:
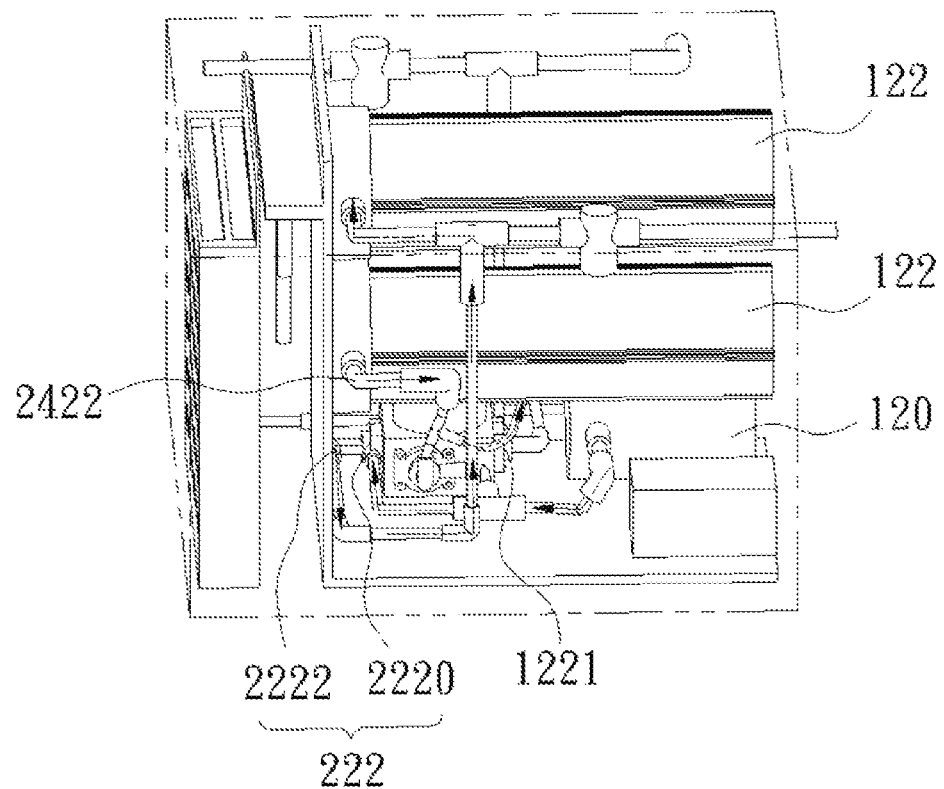
FIG. 7 is another schematic perspective view of transferring clean water to clean a filter according to the present invention.
Figure 8:
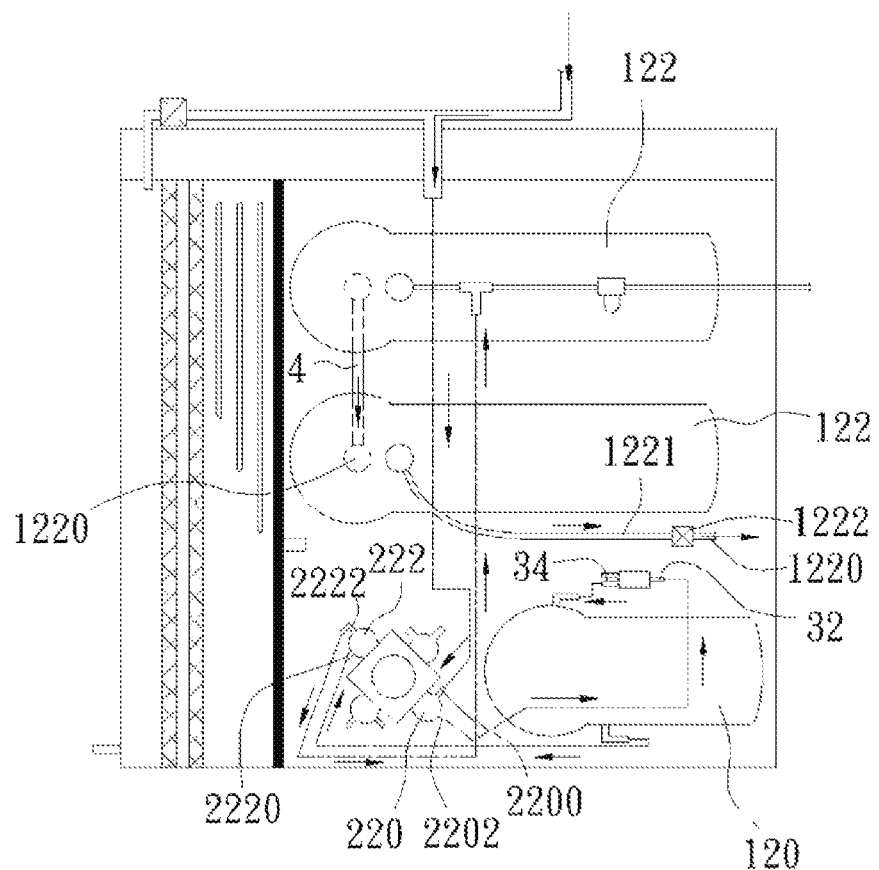
FIG. 8 is a schematic operation view of transferring clean water to clean a filter according to the present invention.

Referring to FIG. 6, FIG. 7, and FIG. 8 together for a schematic perspective view of transferring clean water to clean a filter according to the present invention, another schematic perspective view of transferring clean water to clean a filter, and a schematic operation view of transferring clean water to clean a filter, it can be seen from the figures that for example, clean water is transferred to clean two filters. Arrows in the figure indicate a transfer direction of clear water. The clean water is mainly externally input tap water, and must be transferred from the first input pipe 2200 in the first clean water pipe group 220 to the second inlet pipe 32 through the first output pipe 2202, and then be input to the pressurizing device 120 by the first drainpipe 34. The pressurized clean water is transferred from the second input pipe 2220 in the second clean water pipe group 222 to the uppermost filter 122 through the second output pipe 2222 and cleans the interior of the filter. In this embodiment, one of two filters 122 is connected to the second output pipe 2222, and the input clean water cleans the filter 122. Because a filtered water transfer pipe 4 for transferring wastewater or clean water is additionally disposed between two filters 122, after cleaning the first filter 122, the clean water can be discharged from the original second wastewater outlet pipe 2422. Because the transfer pipe 1221 is connected to the second wastewater outlet pipe 2422, the clean water after the cleaning is discharged by the transfer pipe 1221 through the control valve 1222, so that a discharge amount of the transfer pipe 1221 can be controlled by the control valve 1222.

Figure 9:
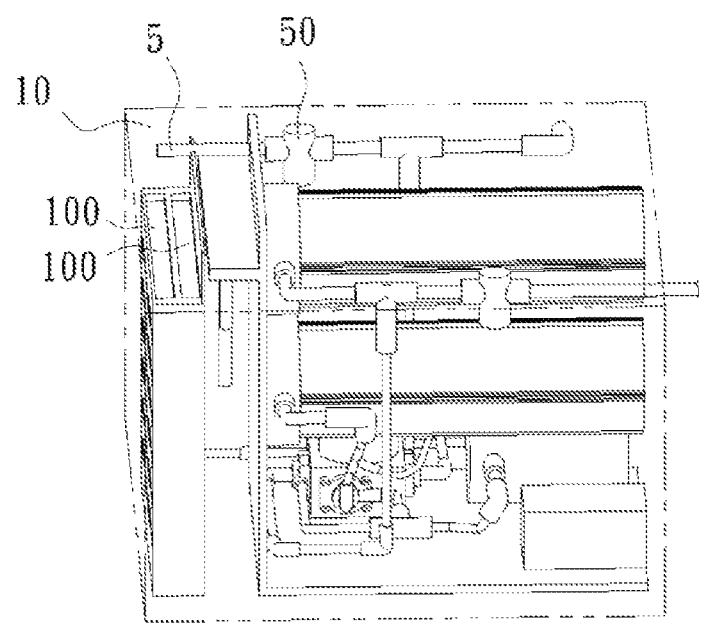
FIG. 9 is a schematic perspective view of transferring clean water to clean a filtering apparatus according to the present invention.
Figure 10:
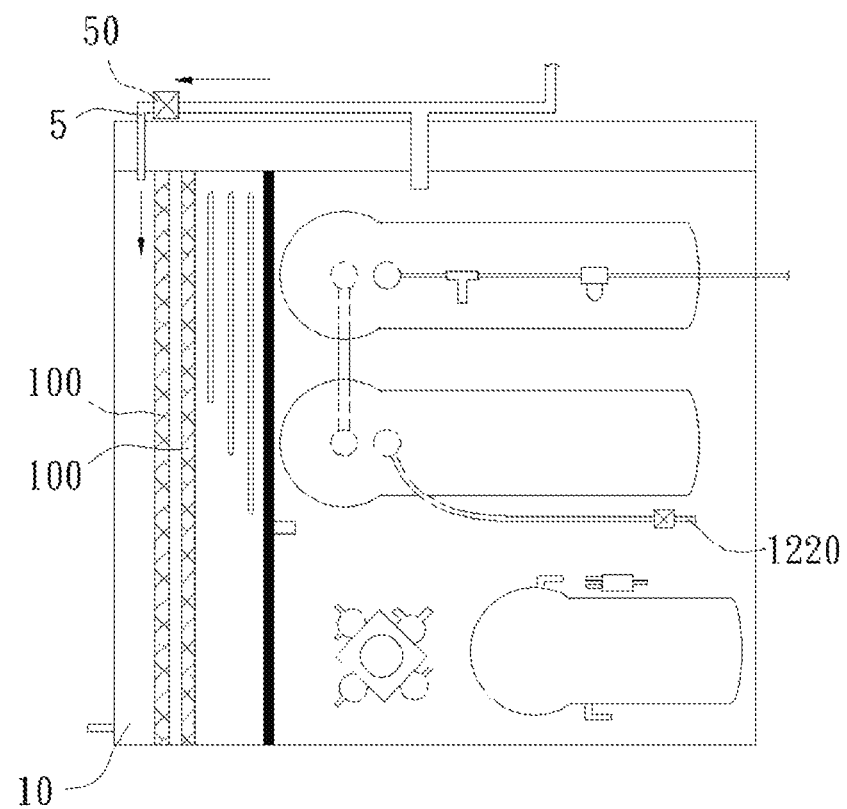
FIG. 10 is a schematic operation view of transferring clean water to clean a filtering apparatus according to the present invention.

In addition, it can be additionally seen from FIG. 9 and FIG. 10 that clean water is transferred to clean the filtering apparatus. Additionally, a filtering screen cleaning pipe 5 is connected to a tap water inlet, and the filtering screen cleaning pipe 5 is provided with a control valve 50. The filtering screen cleaning pipe 5 is connected to the filtering space 10 and located above the filtering apparatus 100. While the filtering apparatus 100 is being cleaned, it is only required to control the control valve 50 to have external tap water passing through the filtering screen cleaning pipe 5 so as to clean the filtering apparatus 100. In this way, the effect of filtering wastewater by the filtering apparatus 100 can be maintained, and sewage after the cleaning can be discharged by an electromagnetic valve.

The present invention mainly can achieve the following objectives: 1. Recycled wastewater can be filtered into clean water through the toilet tank device 1, which helps expand the use range of the recycled wastewater. 2. Wastewater from sanitary fixtures is fully automatically recycled and reused, making it completely exempt from the need of human monitoring to achieve the objective of wastewater reuse. 3. Filtering devices are automatically cleaned, which extends the service life of the toilet tank device 1 while maintaining the overall filtering effect, and improves the problem of decrease in the quality of the filtering due to long-term use.

Figure 11:
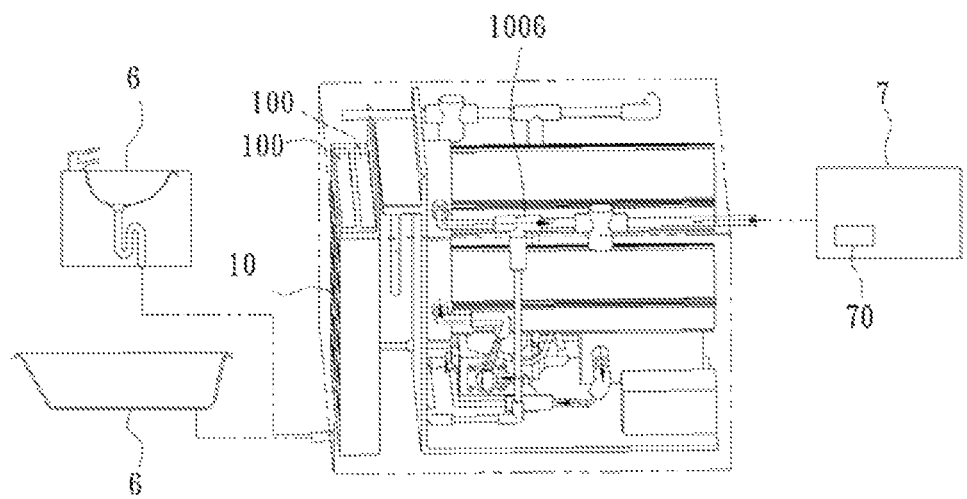
FIG. 11 is a schematic view of a use state of the present invention connected to an external device.
Figure 12:
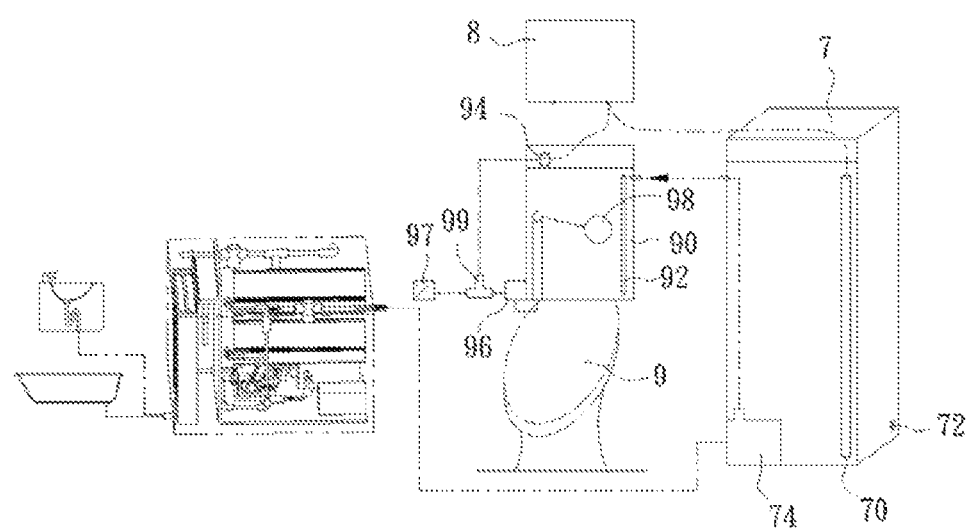
FIG. 12 is a schematic view of a use state of the present invention in combination with a toilet and a tank.

Referring to FIG. 11 and FIG. 12 together for a schematic view of a use state of the present invention connected to an external device and a schematic view of a use state of the present invention in combination with a toilet and a tank, mainly, the apparatus is additionally connected to an external sanitary fixture 6 (which may be a sink basin or a bathtub) and a reserve tank 7. Wastewater after use of the external sanitary fixture 6 can be filtered through the filtering apparatus 100 that is connected to the filtering space 10 so that the wastewater can be input. After the wastewater is filtered into clean water, the clean water is output from the purified water transfer pipe 1006 to the reserve tank 7 for storage and use, to achieve the objective of wastewater recycling, storage, and reuse. Further, the reserve tank 7 is internally provided with a tank water level sensor 70, a drain port 72, and a pumping motor 74. The tank water level sensor 70 is in signal connection with a control box 8 to determine a water level status in the reserve tank 7. When a water level of the reserve tank is lower than a predetermined level, clean water obtained after filtering is used for supplement (storage). When the water level of the reserve tank is lower than a specified minimum standard, that is, no water is available during showers and facing washing, the control box 8 controls the system to immediately switch to direct tap water supply for the toilet tank with a normal amount of water, and then the water is pumped by the pumping motor 74 to the toilet tank device 90 of the toilet device 9 to complete water supplement. When the toilet tank water level sensor 92 disposed in the toilet tank device 90 senses that the water level is lower than a specified maximum standard, the control box 8 immediately instructs the reserve tank to pump water to the toilet tank device 90 through the pumping motor 74 to supplement water of an amount required by the toilet tank. When the water level of the reserve tank is below a lower limit (no water), when the water level of the toilet tank is also lower than a standard, the control box 8 instructs to supplement water of an amount required by the toilet tank with tap water through the electromagnetic switch 94. The drain port 72 can supply additional water to satisfy an additional external need (for example, cleaning).

If power failure or signal abnormality occurs, the control box 8 controls the system to immediately switch to tap water supplement through the electromagnetic switch, and the water level of the toilet tank is controlled by a tank buoy switch. When power supply or the signal source returns to normal status, the normal automatic water saving function is immediately restored.

The control box 8 determines the amount of clean water in the reserve tank 7 in a signal connection manner. A control valve 94 for tap water supplement of the toilet tank, a tap water source switching apparatus 96, and a tap water supply device 97 are all connected to the three-way pipe 99. When the tap water source switching apparatus 96 determines that an abnormal state (for example, power failure or failure to normally supplement water) occurs, a water supplement buoy apparatus 98 in the toilet tank device 90 is started through the control valve 96 for tap water supplement of the toilet tank to perform the external water supplement manner originally from the tap water supply device 97, to ensure that the toilet tank device 90 can maintain a fixed water level.

The tap water source switching apparatus 96 can select a water supply source based on a power supply status. When it is determined that a power outage or power off state is encountered, the tap water source switching apparatus 96 switches the water source to external tap water for use in the toilet tank. Otherwise, if it is in a power on state, the tap water source switching apparatus 96 resumes use of recycled water for use in the toilet tank.

What is claimed is:

1. A modified apparatus for wastewater recycling, comprising:
   a toilet tank device, comprising a filtering space and a device area, wherein the filtering space is provided with a filtering apparatus and a water level sensing apparatus, and the device area is provided with a pressurizing device, at least one filter, and a transfer pipe connected to the filtering space to transfer filtered water;
   a water amount control assembly, comprising a driving apparatus, a cleaning pipe group in which a flow direction of clean water is controlled by the driving apparatus, and a wastewater transfer pipe group in which a flow direction of wastewater is controlled by the driving apparatus; and
   a three-way pipe, comprising a first inlet pipe, a second inlet pipe, and a first drain pipe connected to the first inlet pipe and the second inlet pipe; wherein
   the wastewater transfer pipe group comprises a first wastewater pipe group and a second wastewater pipe group, the first wastewater pipe group is provided with a first wastewater input pipe connected to the filtering space to transfer recycled wastewater and a first wastewater output pipe connected to the first inlet pipe, and the second wastewater pipe group is provided with a second wastewater input pipe connected to the pressurizing device and a second wastewater output pipe connected to the filter;
   the cleaning pipe group comprises a first clean water pipe group and a second clean water pipe group, the first clean water pipe group is provided with a first input pipe connected to an external clean water inlet and a first output pipe connected to the second inlet pipe, and the second clean water pipe group is provided with a second input pipe connected to the pressurizing device and a second output pipe connected to the filter; and
   the first drain pipe is connected to the pressurizing device, the first inlet pipe is connected to the wastewater transfer pipe group so that wastewater is transferred to the pressurizing device through the first drain pipe and then filtered by the filter and discharged, and the second inlet pipe is connected to the cleaning pipe group so that clean water is transferred to the pressurizing device through the first drain pipe, and is transferred to the filter for cleaning and then discharged.

2. The modified apparatus for wastewater recycling according to claim 1, wherein the transfer pipe is connected to the second wastewater output pipe; and
   a control valve is connected to the transfer pipe for controlling a water discharge amount of the transfer pipe.

3. The modified apparatus for wastewater recycling according to claim 1, wherein the filter is provided with a water flow switch controlled by the driving apparatus.

4. The modified apparatus for wastewater recycling according to claim 3, further comprising a purified water transfer pipe connected to the water flow switch.

5. The modified apparatus for wastewater recycling according to claim 4, further comprising a reserve tank that is connected to the purified water transfer pipe to store clean water and is internally provided with a tank water level sensor, a drain port, and a pumping motor.

6. The modified apparatus for wastewater recycling according to claim 5, further comprising a control box in signal connection with the tank water level sensor to determine the water level status in the reserve tank.

7. The modified apparatus for wastewater recycling according to claim 6, further comprising a toilet device, wherein the toilet device is provided with the toilet tank device, and the toilet tank device is provided with a toilet tank water level sensor in signal connection with the control box to determine a water amount of clean water in the toilet tank, and a control valve for tap water supplement of the toilet tank.

8. The modified apparatus for wastewater recycling according to claim 7, further comprising a tap water source switching apparatus connected to the control valve for tap water supplement of the toilet tank.

9. The modified apparatus for wastewater recycling according to claim 1, wherein the filtering apparatus comprises a plurality of filtering screens.

10. The modified apparatus for wastewater recycling according to claim 1, further comprising a filtered water transfer pipe mounted between a plurality of filters to transfer wastewater or clean water.

11. The modified apparatus for wastewater recycling according to claim 1, further comprising an external sanitary fixture that is coupled to the filtering space to input wastewater.

* * * * *